No. 792,844. PATENTED JUNE 20, 1905.
E. PERRON & W. A. SAWYER.
BRAKE FOR RUBBER TIRED VEHICLES.
APPLICATION FILED OCT. 28, 1904.
2 SHEETS—SHEET 1.
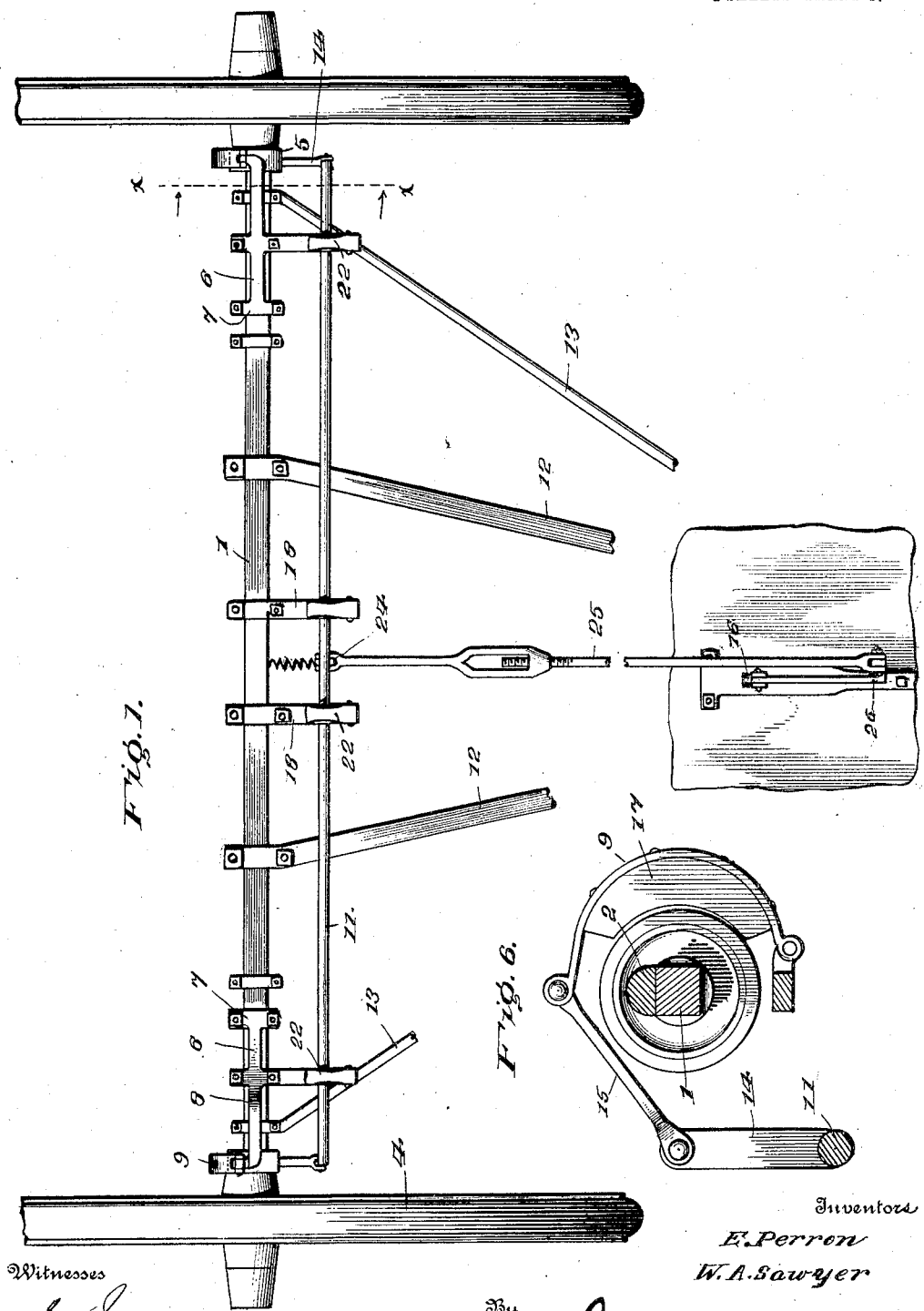
Witnesses
Inventors
E. Perron
W. A. Sawyer
By
Attorneys No. 792,844. PATENTED JUNE 20, 1905.
E. PERRON & W. A. SAWYER.
BRAKE FOR RUBBER TIRED VEHICLES.
APPLICATION FILED OCT. 28, 1904.
2 SHEETS—SHEET 2.
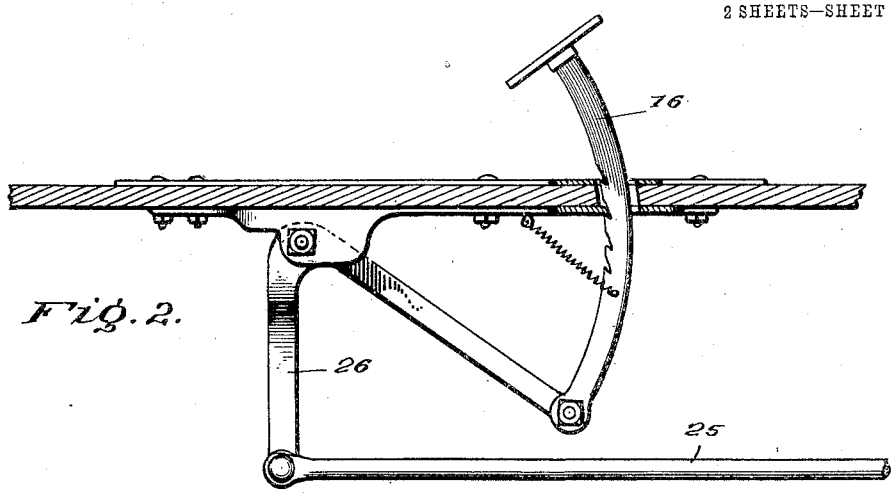
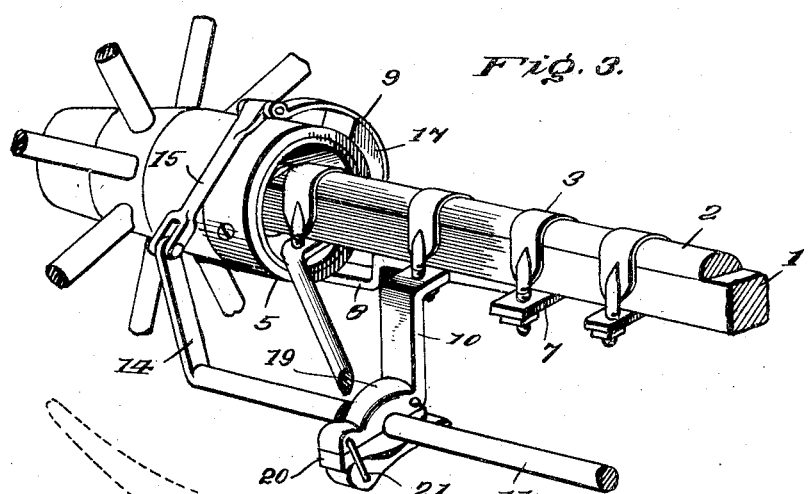
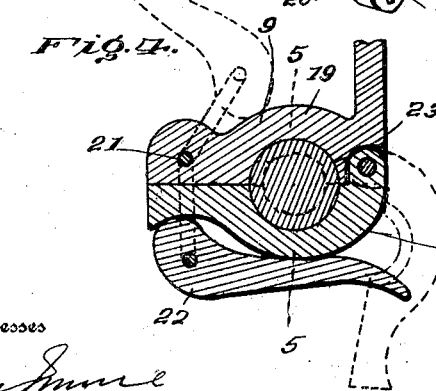
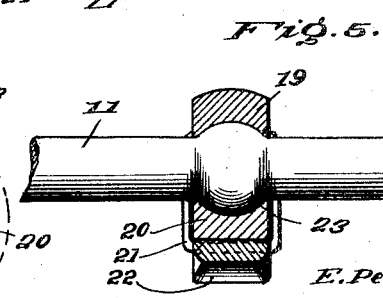
Inventors
E. Perron
W. A. Sawyer
Witnesses
By
Attorneys No. 792,844.

Patented June 20, 1905.

UNITED STATES PATENT OFFICE.

EDGARD PERRON AND WILLIAM A. SAWYER, OF ROCKLAND, MICHIGAN.

BRAKE FOR RUBBER-TIRED VEHICLES.

SPECIFICATION forming part of Letters Patent No. 792,844, dated June 20, 1905.

Application filed October 28, 1904. Serial No. 230,437.

*To all whom it may concern:*

Be it known that we, EDGARD PERRON and WILLIAM A. SAWYER, citizens of the United States, residing at Rockland, in the county of Ontonagon and State of Michigan, have invented certain new and useful Improvements in Brakes for Rubber-Tired Vehicles, of which the following is a specification.

This invention is primarily intended for road-vehicles equipped with soft-tread tires, such as mechanically-propelled vehicles, the purpose being to obviate injury to such tires when the brake is set, as would be the case if the brake-shoe came in contact with the tire.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a horizontal view of the rear portion of the running-gear of a vehicle equipped with a brake constructed in accordance with the invention. Fig. 2 is a detail view in elevation of the foot-lever and connecting means for operating the brake. Fig. 3 is a detail perspective view of an end portion of an axle and the hub portion of a vehicle-wheel embodying the invention. Fig. 4 is a longitudinal section of the lower portion of a bracket supporting the brake. Fig. 5 is a transverse section of the lower portion of the bracket on the line 5 5 of Fig. 4, showing a portion of the brake-shaft in side elevation. Fig. 6 is a detail section on the line $x$ $x$ of Fig. 1 looking in the direction of the arrows, illustrating the parts on a larger scale.

Corresponding and like parts are referred to in the following description and indicated in all the views of the drawings by the same reference characters.

The axle 1 is reinforced in the usual manner by means of the stay-piece 2, the parts being connected by clips 3 in the accustomed way. The vehicle-wheel 4 is mounted upon the arm or spindle of the axle in any determinate manner, and a metal band 5 is firmly attached to the inner end of its hub and constitutes an element of the brake mechanism. A bar 6 is provided near each end of the axle and is arranged beneath the same and is provided at its inner end with a cross-bar 7, having its end portions apertured to receive the legs of the coöperating clip. The bar 6 is offset at a point between its ends, as shown at 8, to throw its outer end portion some distance below the axle, so as to clear the inner end of the hub, the terminal portion of the bar curving downward and rearward and having one end of the brake band or strap 9 connected thereto. A bracket 10 is pendent from the bar 6 at a point near the offset 8 and is provided at its lower end with a bearing in which is journaled the brake-shaft 11. The upper arm of the bracket 10 projects beyond the opposite sides of the axle 1, and the projecting portions are apertured to receive the legs of the coöperating clip 3. The members comprising the reach are indicated at 12 and the rear hounds at 13, said parts being clipped to the axle in the usual way.

The brake-shaft 11 is provided at its ends with arms 14, which are connected by links 15 to the loose ends of the brake band or strap 9, the parts being arranged to admit of the part 9 gripping the part 5 upon turning the brake-shaft in one direction, as when pressing downward upon a foot-lever 16 or operating part provided for setting the brake when required. A wear-piece 17, of wood or other material, is applied to the inner side of the brake-band 9, so as to engage with the brake element 5 and reduce the speed of the vehicle in the manner well known. The brake-shaft 11 is journaled near its ends in bearings applied to the lower ends of the brackets 10 and intermediate of its ends in bearings provided at the lower ends of brackets 18, which are clipped at their upper ends to the axle 1. The bearings at the lower ends of the brackets 10 and 18 are substantially alike and a detailed description of one will suffice for a clear understanding thereof.

Each bearing consists of an upper member 19, rigid with the bracket, and a lower member 20, pivotally connected at one end to the member 19 and free to swing downward at its free end to admit of placing the brake-shaft in position or removing it, as may be required. A link 21 is loosely connected with the outer end of the member 19 and pivotally supports a cam-lever 22 at its lower end. The parts are so proportioned and arranged as to insure clamping of the members 19 and 20 by means of the lever 22 when occupying the position shown by the full lines in Figs. 3 and 4. The outer extension of the member 20 is concave upon its lower side to receive the thrust of the cam-lever 22, as indicated most clearly by the full lines in Fig. 4. When the long arm of the lever 22 is turned downward, its cam end occupies a position to clear the member 20, and said lever and link may be moved out of the path of the member 20, as indicated by the dotted lines in Fig. 4, thereby permitting the free end of the member 20 to swing downward to provide for either removing the brake-shaft or placing the same in position, as desired. The inner or gripping faces of the members 19 and 20 are formed on segments of a sphere, so as to conform to the outer surface of ball-shaped enlargements 23 of the brake-shaft 11. This construction prevents endwise movement of the brake-shaft in its bearings and obviates the rattling and at the same time provides an extended bearing-surface between the members 19 and 20 and the part of the brake-shaft journaled therebetween.

An arm 24 projects from the brake-shaft 11, and a rod or bar 25 is connected thereto and extends to the operating lever or means provided for application of the brake when required. In the present instance an elbow-lever 26 is pivotally connected to a convenient portion of the vehicle-body or running-gear, and one arm is connected to the rod or bar 25 and the other arm to the foot-lever 16. Upon rocking the brake-shaft in one direction the brake-bands 9 are drawn about the brake member 5, thereby setting the brake, the degree of resistance offered depending upon the amount of force applied to the brake-setting lever. Upon rocking the brake-shaft in the opposite direction the brake-bands 9 release the brake members 5 and permit the wheels to turn freely upon the axle-arms. The construction is such that no possible injury can result to the tires of wheels provided with soft treads, since no part of the brake mechanism comes in contact therewith.

Having thus described the invention, what is claimed as new is—

1. In a vehicle-brake, the combination of an axle, a vehicle-wheel loosely mounted thereon and provided at the inner end of its hub with a brake-band, a brake member coöperating with said brake-band, a brake-shaft for operating said brake member and having an enlargement and a separable bearing for the brake-shaft adapted to embrace the enlargement of the latter to prevent longitudinal movement of the brake-shaft, substantially as set forth.

2. In a vehicle-brake, the combination of a vehicle-wheel having a brake-band fitted to its hub, a coöperating brake member, a brake-shaft for actuating the latter brake member, a bearing for the brake-shaft comprising separable parts, a link fitted to one of the members of the bearing, and a cam-lever mounted upon the swinging end of said link and coöperating with the latter to hold the members of the bearing together or to be turned aside to admit of their separation, substantially as set forth.

3. In a vehicle-brake, the combination of an axle, vehicle-wheels mounted thereon and having brake-bands fitted to their hubs, coöperating brake members, a brake-shaft connected with said coöperating brake members, brackets extended from the axle and provided with bearings comprising separable members between which the brake-shaft is journaled, links and cam-levers coöperating with the members of said bearings to hold them closed or to be turned aside to admit of removal of the brake-shaft as may be required, substantially as set forth.

In testimony whereof we affix our signatures in presence of two witnesses.

EDGARD PERRON. [L. S.]
 WILLIAM A. SAWYER. [L. S.]

Witnesses:
 THOMAS P. McKAY,
 G. W. STANNARD.